(12) United States Patent
Hafner et al.

(10) Patent No.: US 9,205,944 B2
(45) Date of Patent: Dec. 8, 2015

(54) METHOD AND APPARATUS FOR TRANSPORTING LABEL STRIPS

(75) Inventors: Dieter Hafner, Regensburg (DE); Wolfgang Roidl, Deuerling (DE)

(73) Assignee: KRONES AG (DE)

( * ) Notice: Subject to any disclaimer, the term of this patent is extended or adjusted under 35 U.S.C. 154(b) by 1207 days.

(21) Appl. No.: 12/293,477

(22) PCT Filed: Mar. 14, 2007

(86) PCT No.: PCT/EP2007/002220
§ 371 (c)(1),
(2), (4) Date: Aug. 14, 2009

(87) PCT Pub. No.: WO2007/107267
PCT Pub. Date: Sep. 27, 2007

(65) Prior Publication Data
US 2009/0301650 A1      Dec. 10, 2009

(30) Foreign Application Priority Data
Mar. 18, 2006   (DE) .......................... 10 2006 012 756

(51) Int. Cl.
*B65C 9/18*    (2006.01)
*B32B 37/26*   (2006.01)
(Continued)

(52) U.S. Cl.
CPC .................. *B65C 9/1865* (2013.01); *B65C 9/00* (2013.01); *B65C 9/10* (2013.01); *B65C 9/18* (2013.01); *B65H 29/54* (2013.01); *B29C 63/0013* (2013.01); *B65C 9/0006* (2013.01); *B65H 2404/1316* (2013.01); *B65H 2404/14* (2013.01);
(Continued)

(58) Field of Classification Search
CPC ...... B32B 37/26; B65C 11/00; B65C 9/0006; B65C 3/12; B65C 3/16; B65C 9/08; B65C 9/18; B65C 9/1865; B65H 37/002; B65H 2404/1316; B65H 2404/14; B65H 2404/143; B65H 2404/531; B65H 29/54; B29C 63/0013; B29C 47/0033; Y10T 156/19; Y10T 156/195; Y10T 156/1972; Y10T 156/1994; Y10T 156/12; Y10T 156/17
USPC ........... 156/495, 764–767, DIG. 11, 247, 289
See application file for complete search history.

(56) References Cited

U.S. PATENT DOCUMENTS 2,484,880 A * 10/1949 Flood ...................... B65C 11/00
                                                         156/DIG. 48
3,247,044 A *  4/1966 Pechmann ................ B65C 3/16
                                                         156/363
(Continued)

FOREIGN PATENT DOCUMENTS

DE          832332     2/1952
DE         1923994     2/1971
(Continued)

OTHER PUBLICATIONS

English translation of DE2702822A1, Jul. 27, 1978.*
(Continued)

*Primary Examiner* — Sonya Mazumdar
(74) *Attorney, Agent, or Firm* — Hayes Soloway P.C.

(57) ABSTRACT

The invention relates to an apparatus and a method for transporting a label strip from a self-adhesive labelling machine, which comprises a frame and at least two grooved rollers attached to the frame, to a label-devoid strip store.

26 Claims, 4 Drawing Sheets

(51) Int. Cl.
*B65H 37/00* (2006.01)
*B65C 9/10* (2006.01)
*B65H 29/54* (2006.01)
B65C 9/30 (2006.01)
B65C 9/00 (2006.01)
B29C 63/00 (2006.01)

(52) U.S. Cl.
CPC ..... *B65H 2404/143* (2013.01); *B65H 2404/531* (2013.01); *Y10T 156/12* (2015.01); *Y10T 156/17* (2015.01)

(56) References Cited

U.S. PATENT DOCUMENTS

| | | | |
|---|---|---|---|
| 3,321,105 A | | 5/1967 | Marano |
| 3,404,059 A | * | 10/1968 | Ritterhoff ................. B65C 3/12 |
| | | | 156/363 |
| 3,619,326 A | | 11/1971 | Burbidge |
| 3,867,233 A | * | 2/1975 | Eder ........................ B65C 9/08 |
| | | | 156/571 |
| 4,048,494 A | * | 9/1977 | Liesting .................... B65C 9/42 |
| | | | 156/DIG. 45 |
| 4,075,944 A | | 2/1978 | Conley |
| 4,253,902 A | * | 3/1981 | Yada ....................... B65C 9/188 |
| | | | 156/361 |
| 4,360,399 A | | 11/1982 | Hamisch, Jr. |
| 4,366,023 A | | 12/1982 | Voltmer |
| 4,403,719 A | | 9/1983 | Yamashita |
| 4,601,771 A | * | 7/1986 | Wesley .................... B65C 3/12 |
| | | | 156/215 |
| 4,967,929 A | * | 11/1990 | Turner ............................ 221/70 |
| 5,076,879 A | | 12/1991 | Svyatsky |
| 5,427,460 A | | 6/1995 | Kajiya |
| 5,531,853 A | | 7/1996 | Cubow et al. |
| 5,788,796 A | * | 8/1998 | Look ..................... B65C 9/1892 |
| | | | 156/234 |
| 5,938,890 A | | 8/1999 | Schlinkmann et al. |
| 6,712,112 B2 | | 3/2004 | Goodwin et al. |
| 6,923,878 B2 | * | 8/2005 | Davis ................... B65C 9/1865 |
| | | | 156/351 |
| 8,646,508 B2 | * | 2/2014 | Kawada ................... B65C 9/18 |
| | | | 156/539 |
| 2003/0121593 A1 | | 7/2003 | Monroe |
| 2004/0089127 A1 | | 5/2004 | Hong |

FOREIGN PATENT DOCUMENTS

| | | | | |
|---|---|---|---|---|
| DE | 2638441 | C2 | 11/1977 | |
| DE | 2702822 | A1 * | 7/1978 | |
| DE | 2702822 | A1 * | 7/1978 | ............ B65C 9/1865 |
| DE | 3943827 | B4 | 4/2004 | |
| DE | 4409819 | B4 | 8/2004 | |
| DE | 10305559 | A1 | 8/2004 | |
| EP | 0036193 | A1 | 9/1981 | |
| EP | 0049232 | B1 | 8/1984 | |
| EP | 1445195 | A1 | 8/2004 | |
| EP | 1619129 | A1 | 1/2006 | |
| FR | 2679518 | A1 | 1/1993 | |

OTHER PUBLICATIONS

English translation of EP267518.*
English translation of EP1445195; Aug. 11, 2004.*
English translation of DE2702822A1; Jul. 27, 1978.*
International Search Report for PCT Application No. PCT/EP2007/002220, dated Jun. 21, 2007.

* cited by examiner

METHOD AND APPARATUS FOR TRANSPORTING LABEL STRIPS

CROSS-REFERENCE TO RELATED APPLICATION

This application is filed under 35 U.S.C. 371 as a US national phase application of PCT/EP2007/002220, having an international filing date of Mar. 14, 2007, which claims the benefit of DE 10 2006 012 756.0 having a filing date of Mar. 18, 2006, the contents of which are hereby incorporated by reference in their entirety.

TECHNICAL FIELD

The invention relates to an apparatus and a method for transporting a label strip.

BACKGROUND

There are various ways of labelling containers, such as e.g. labelling the containers around the circumference using label strips from the roll or from a label magazine, or else labelling the containers with self-adhesive labels, the latter variant mainly being used for high-quality labelling processes. By labelling with self-adhesive labels, it is possible for example to produce a so-called "no label look". In this case, the edge regions of the label are designed to be as transparent as possible, so that only the information, but not the label per se, can be seen on the labelled container.

Labelling with self-adhesive labels is usually more expensive than labelling using other methods; however, this variant is increasingly gaining in popularity due to the high quality and the wide range of design options.

In recent years, therefore, there have been some developments to drive forward the process of high-speed labelling with self-adhesive labels. Modern labelling machines for self-adhesive labels, as known for example from US 2003121593, have an automatic splicing station for label strips in order to minimise or eliminate the downtimes of the machines when changing the label strip rolls.

However, one problem with such machines is the fact that, although the downtimes with regard to the label strip supply have been minimised or eliminated, the empty carrier strip has to be conveyed away and stored after the labelling process. To date, the empty carrier strip has been conveyed away and stored on a roll, as shown in EP 1619129 A1. When the label-devoid strip store—here in the form of a roll—is full, this has to be replaced. The situation is therefore obtained whereby, although the downtime of the machines with regard to the label supply has been minimised, in terms of conveying away the carrier strip it is still necessary to take account of machine downtimes when replacing the label-devoid strip store.

It would therefore be desirable to provide a transport apparatus for label strips and also a method, by which apparatus/method a carrier strip can be transported away quickly and reliably.

SUMMARY OF THE INVENTION

According to one aspect of the invention, an apparatus for transporting a label strip with at least one carrier strip includes a frame; and at least two rollers attached to the frame, wherein the two rollers have grooves. According to another aspect of the invention, a method for labeling containers with a label, which is located on a carrier strip, includes feeding a carrier strip from a storage roll to a dispensing edge, transferring a label from the dispensing edge to a container being guided past the dispensing edge, and transporting the carrier strip away from the dispensing edge to a label-devoid strip store by way of a transport device having a frame and at least two rollers attached to the frame.

According to one preferred further development of the invention, one roller is driven by a dedicated motor. This has the advantage that the transport of the label strip, which bears against the driven roller, can take place in a very precise manner. The second roller is preferably driven indirectly via the first roller, either due to the fact that a belt, a cam belt or the like connects the two rollers, or preferably due to the fact that the two rollers make contact, so that the second roller is moved as a result of the rolling movement of the first roller against the second roller. However, it is also conceivable that each roller has its own dedicated motor, so that an even more precise application of force to the carrier strip that is to be transported away can take place.

The grooves in the rollers are preferably applied in the circumferential direction. At least the remaining surface is provided with a surface structure or with a coating, or consists of a material which has so high a coefficient of friction with respect to the carrier strip that trouble-free and slip-free transport of the carrier strip can take place. According to one preferred further development of the invention, one roller has a rubber coating in order to meet these requirements of slip-free transport. According to one particularly preferred further development of the invention, the other roller is made of metal, preferably steel, and has a fluted or structured surface.

By virtue of this combination of the contact between the two rollers, the rubber coating of one roller on the one hand and the fluted metal roller on the other hand, an optimal, trouble-free and slip-free transport of the carrier strip can take place.

According to one preferred further development of the invention, one roller has a scraper element, and with particular preference the two rollers each have a scraper element. Such a scraper element is preferably designed as a rake which surrounds the rollers at least over part of their circumference, with the fingers of the rake preferably being located in the grooves. These scraper elements have the advantage that any residues left on the carrier strip—such as labels that have not detached for example—will not wrap around one of the rollers and thus cause problems. By virtue of these scraper elements, the residues from the carrier strip either adhere to the latter or adhere to the scraper element, which nevertheless does not pose any problem for the further transport operation. The scraper element therefore ensures that the surface properties of the rollers are not altered by residues. As a result, this ensures trouble-free transport of the carrier strip.

One preferred further development of the invention has a strip guiding device which makes it possible to further convey the carrier strip downstream of the two grooved rollers. The strip guiding device may be a channel which closely guides the carrier strip and thus allows a defined discharge to the label-devoid strip store; however, it may also be a wider channel which does not closely guide the carrier strip but does prevent random movement of the carrier strip—e.g. due to static charging—when being transported away.

In order to prevent static charging of the carrier strip, or to reduce this at least partially, it is conceivable to arrange a device for preventing/reducing static charging in the vicinity of the transport apparatus. Such a device may be e.g. a blowing device which transports ionised air in the direction of the carrier strip and/or the strip guiding device.

The strip guiding device is preferably designed as a holder for a label-devoid strip store. It is conceivable for example that the label-devoid strip store is formed by a bag, into which the carrier strip is introduced by the two grooved rollers. In such a case, the strip guiding device may be designed as a bag holder, so that it performs two functions, namely on the one hand the guidance of the carrier strip and on the other hand the holding of the bag.

The label-devoid strip store may however also be designed in some other way, such as e.g. in the form of a large basket or a large box, in which the carrier strip is stored e.g. in meandering fashion due to the guidance of the strip guiding device. To this end, it is also conceivable that the strip guiding device is made to move in order to be able better to achieve this meandering storage by moving the strip guiding device.

However, it is also conceivable to store the label-devoid strip or carrier strip in another form, namely e.g. in the form of carrier strip shreds. For example, it is possible for the carrier strip to pass the rollers and the strip guiding device in the downstream direction, it then being fed to a central carrier strip disposal system, wherein said carrier strip can then be transported away both downwards (e.g. in the floor of the hall) and upwards (e.g. via a suction device). After being transported away, the strip can then be shredded. Shredding in the suction pipe and subsequent discharge to a central carrier strip disposal system is also conceivable.

One particularly preferred further development of the apparatus consists in that an exchangeable frame is attached downstream of the two grooved rollers, said exchangeable frame having at least two strip guiding devices. In this case, however, just one strip guiding device is actively connected to the grooved rollers at any given time. The exchangeable frame is preferably equipped with a handle which makes it possible to displace it in such a way that it is possible to change between positions in which a respective other strip guiding device is actively connected to the two grooved rollers. When using a bag or a box or the like as the label-devoid strip store, a simple changeover from one label-devoid strip store to another label-devoid strip store can take place by means of the exchangeable frame. This ensures that an almost continuous use of the labelling machine is possible with regard to the carrier strip being transported away.

Preferably, the exchangeable frame has for each strip guiding device at least one cutting element and/or counter-element which, upon actuation of the exchangeable frame, cooperates with the carrier strip in such a way that a severing of the latter takes place.

Although the apparatus is extremely reliable, it is possible to attach at least one grooved roller in a movable manner such that it can be moved away from the other grooved roller in order for example to eliminate any disruption in the form of residual labels on the scraper elements.

One preferred further development of the method is such that the label-devoid strip/carrier strip is transported from a dispensing edge in the direction of the device for transporting it away, wherein the grooved rollers there transport the label-devoid strip/carrier strip via the strip guiding device into the label-devoid strip store. Once a label-devoid strip store is full, the exchangeable frame is actuated so that a second strip guiding device is actively connected to the two grooved rollers and the label-devoid strip can then be transported away via a second strip guiding device into a new label-devoid strip store. It will be understood here that, the larger the label-devoid strip store, the longer the period of time for which the label-devoid strip can be transported away into the label-devoid strip store without having to change to a new label-devoid strip store. It can be seen from this inter alia that there are no restrictions with regard to the label-devoid strip store and thus any conceivable storage medium can be used.

One specific embodiment of the invention will be explained in more detail with reference to the following figures.

DETAILED DESCRIPTION

Figure 1:
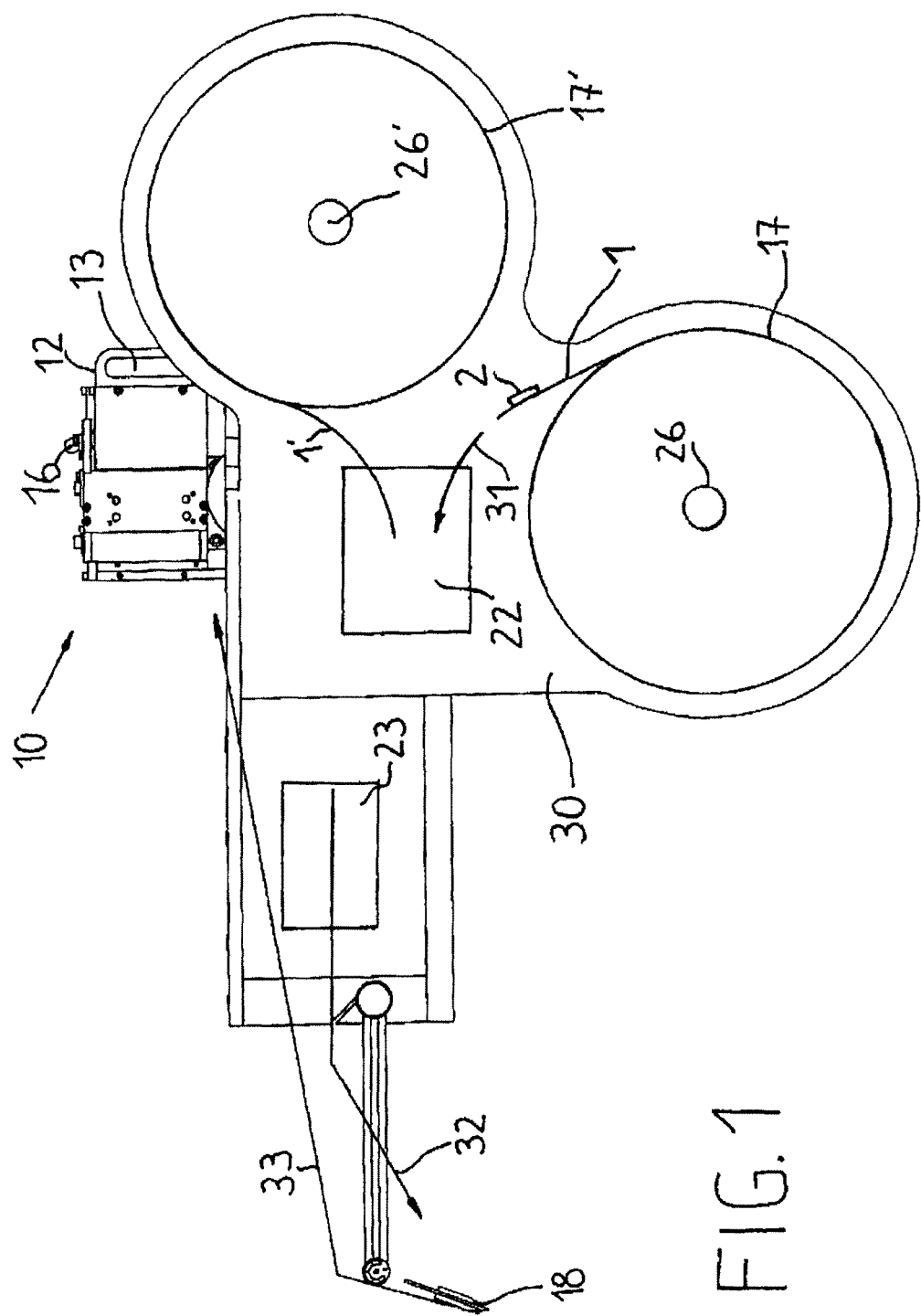
FIG. 1 shows a plan view of a labelling unit for self-adhesive labels.

FIG. 1 shows a labelling unit for self-adhesive labels, as can be attached to a labelling machine, comprising a table 30 on which two storage rolls 17 are located, each of which consists of a roll core 26 and of a carrier strip 1 wound around the latter and comprising the labels 2. By way of example, a carrier strip 1 with a label 2 located thereon can be seen on the storage roll 17.

The carrier strip 1 with the labels 2 is guided in the direction of the arrow 31 through a splicing station 22 to a label strip store 23. Also located in the splicing station 22 is a prepared carrier strip 1' on a storage roll 17', which is spliced to the carrier strip 1 as soon as the storage roll 17 comes to an end. In this way, an almost continuous labelling of containers is possible.

The label strip store 23 serves to provide a certain stock of the carrier strip 1, 1' so that the labelling process can continue despite the splicing operation, which usually entails a brief stoppage of the storage rolls 17. During the splicing operation, therefore, usually no label strip is drawn from the storage rolls 17, 17' but instead labels from the label strip store 23 are used.

Thereafter, the carrier strip 1 is transported in the direction of the arrow 32 to a dispensing edge 18, where it is significantly deflected so that the labels 2 detach from the carrier strip 1 and can thus be transferred to the containers to be labelled which are not shown here). The label-free carrier strip 1 is then further conveyed in the direction of the arrow 33 to the apparatus 10, where it is then fed to the label-devoid strip store.

Figure 2:
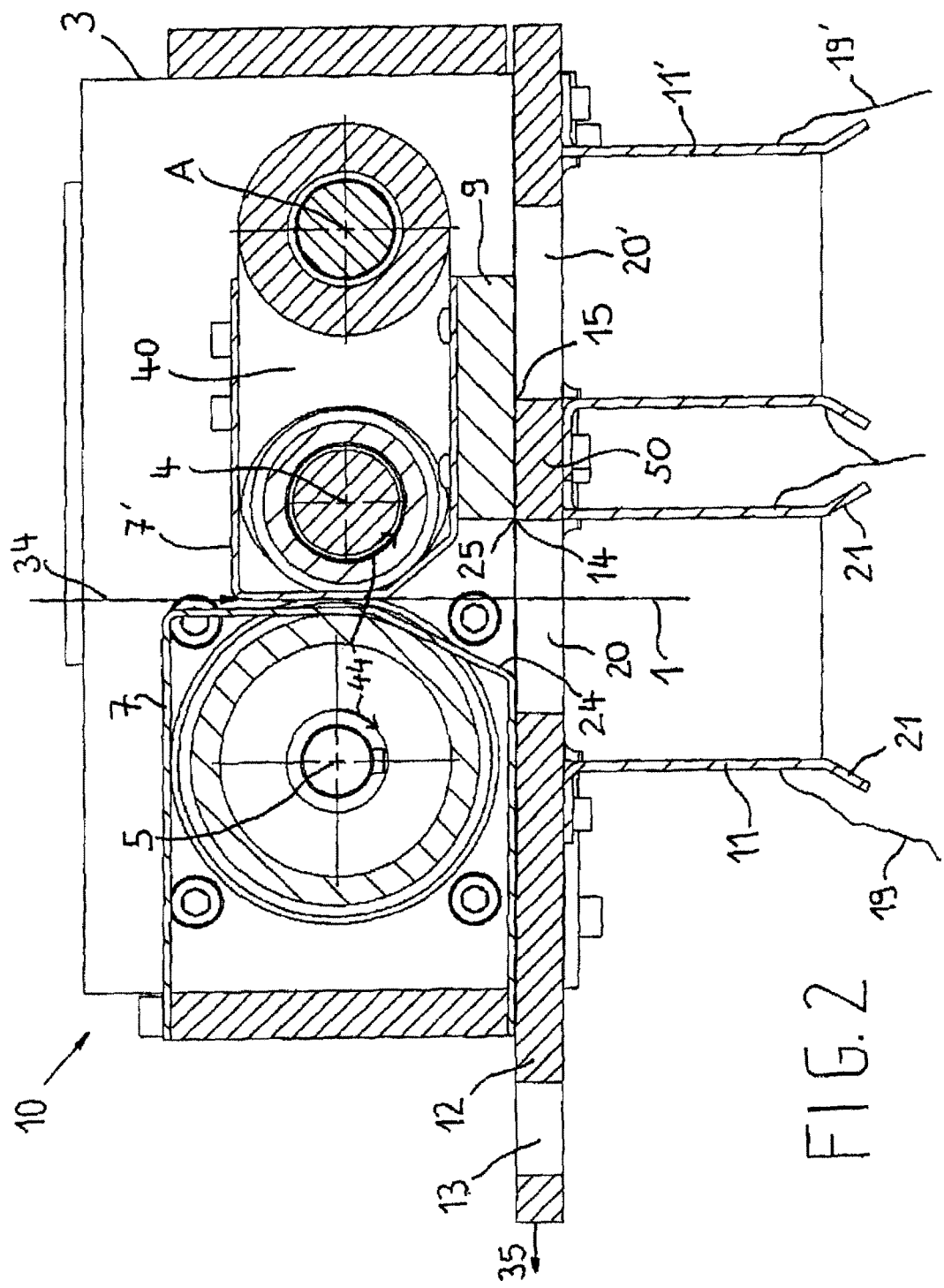
FIG. 2 shows a side view of an apparatus for transporting a label-devoid strip.

FIG. 2 shows the apparatus 10 in a sectional view from the side. Here, the carrier strip 1 is transported downwards through the apparatus 10 from above in the direction of the arrow 34. In this case, the apparatus 10 has a frame 3, on which the subsequent objects are fixed or mounted.

It is possible to see the two grooved rollers 5 and 4, the grooved roller 5 having a larger diameter than the grooved roller 4. Here, the two grooved rollers 4, 5 are arranged with respect to one another in such a way that they make contact over part of their circumference and thus clamp the carrier strip 1 being guided past their contact surface and transport it with a force fit. In the process, they move in a direction as shown by the arrow 44.

The grooved rollers 4, 5 are in this case surrounded by scraper elements 7, 7' which protrude into the grooves in an extended contact area of the two rollers 4, 5. The scraper elements 7, 7' are therefore designed as rakes at least in this region. They greatly increase the functional reliability of the apparatus 10, since disruptive influences, such as e.g. labels still located on the carrier strip 1, are eliminated due to the fact that they are picked up or scraped off by the scraper elements 7, 7', without winding around the grooved rollers 4, 5. The scraper element 7' is attached to a securing element 9 which is in turn part of the frame 3.

Downstream of the grooved rollers 4, 5 there is an exchangeable frame 12 which has a handle 13 at one side. The exchangeable frame 12 additionally has two cutouts 20, 20' which are each actively connected to one of the strip guiding devices 11, 11'.

FIG. 2 shows a situation in which the carrier strip 1 is transported by the grooved rollers 4, 5 downwards in the direction of the arrow 34, through the cutout 20 and the strip guiding device 11, into a label-devoid strip store 19 which is shown here as a bag. The label-devoid strip store 19 is attached to the holding plate 21 of the strip guiding device 11' by means of a holding device (not shown here), such as e.g. a magnet, a gum, a clip or the like. The strip guiding devices 11, 11' therefore serve here as bag holders.

Due to the continual transport of the carrier strip 1 into the label-devoid strip store 19, a pressure is generated which compresses the carrier strip 1 in the store. Once the label-devoid strip store 19 is full, however, it must be changed. To this end, the exchangeable frame 12 is displaced with the aid of the handle 13 in the direction of the arrow 35. As a result, the strip guiding device 11 is moved into the position in which the strip guiding device 11 was previously located. A filling of the label-devoid strip store 19' can now take place while the label-devoid strip store 19 is replaced.

As a result of the displacement of the exchangeable frame 12 in the direction of the arrow 35, at the same time the carrier strip 1 is severed by the cutting element 14 and the counter-element 24 moving past one another. When, at a later point in time, the label-devoid strip store 19' is full, the exchangeable frame 12 is moved in the direction opposite the arrow 35, so that the position of the strip guiding device 11 is once again that shown in FIG. 2. Before the exchangeable frame 12 can be returned to the starting position as just described, the label-devoid strip store 19 must of course be replaced.

Also when returning the exchangeable frame 12 to the starting position, the carrier strip 1 is severed since it is cut by the cutting element 15 and the counter-element 25. Here, the counter-element 25 is located at the lower end of the securing element 9. The cutting element 14 is located at the left-hand upper side of the web 50 of the exchangeable frame 12 between the two strip guiding devices 11, 11'. The cutting element 15 is located at the right-hand upper side of the web 50 of the exchangeable frame 12 between the two strip guiding devices 11, 11', while the counter-element 24 is located on the underside of the scraper element 7.

Figure 3:
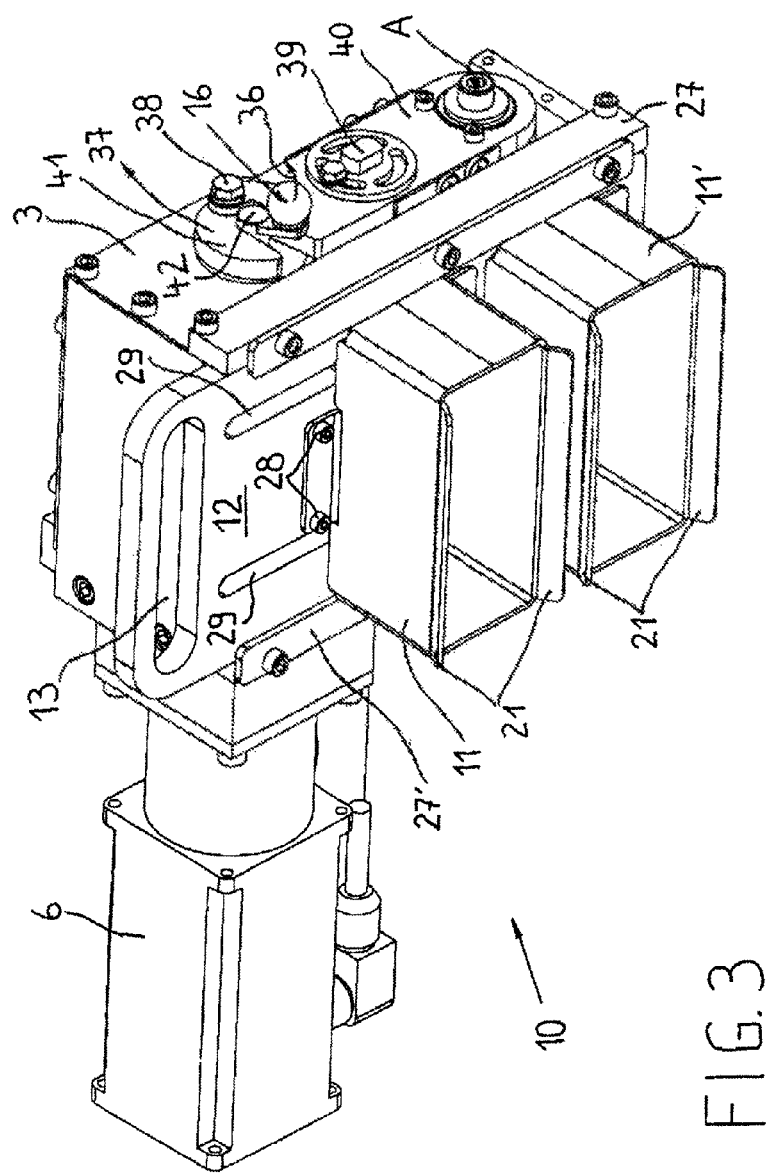
FIG. 3 shows an isometric view of such an apparatus.

FIG. 3 shows an isometric view of the apparatus 10 from below, with the motor 6 of the roller 5 being clearly visible here. It is also possible to see the exchangeable frame 12 with the handle 13, which is guided below the frame 3 of the apparatus 10 in two rails 27, 27'. The strip guiding device 11 is attached by screws 28 to the exchangeable frame 12. The exchangeable frame 12 moreover has two sliding grooves 23, by means of which a reliable displacement of the exchangeable frame 12 in the direction of the arrow 35 is ensured.

In order to ensure the accessibility of the two grooved rollers 4, 5, a pivoting mechanism 40 is provided. For pivoting, a locking mechanism 16 is moved in the direction of the arrow 36 so that the hook 41 located at the left-hand end of the pivoting mechanism 40 can be pivoted about the rotation axis A in the direction of the arrow 37. Since the roller 4 is mounted in this pivoting mechanism 40, said roller is pivoted by the movement just described, as a result of which accessibility to the two rollers 4, 5 is ensured.

The pivoting-in of the roller 4 takes place by the pivoting mechanism 40 being pivoted about the rotation axis A in the direction opposite that of the arrow 37, so that the hook 41 of the pivoting mechanism 40 latches into the cylindrical element 42 located at the end of the roller 5. The locking mechanism 16 is then pivoted about the rotation point 38 in the direction opposite the arrow 36 and is fixed to the cylindrical element 42. The grooved roller 4 is provided on the outer sides with an eccentric adjustment means 39 so as to be able to carry out an adjustment in the direction of the roller 5. An optimal engagement of the two grooved rollers 4, 5 with regard to the contact force is ensured as a result.

Figure 4:
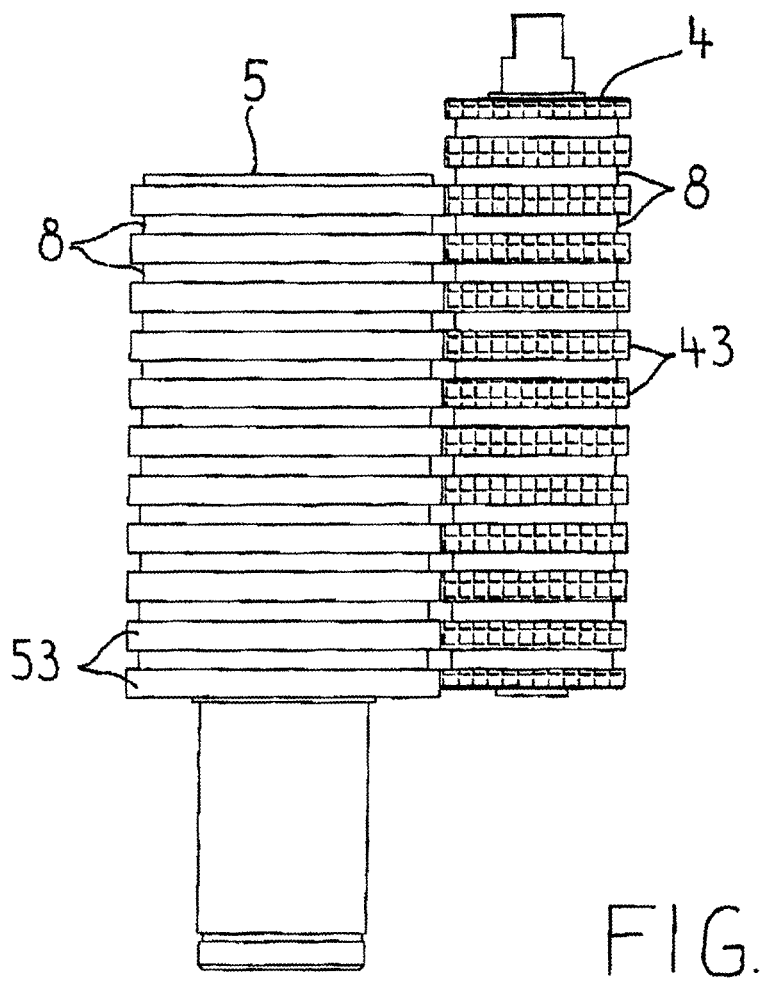
FIG. 4 shows a plan view of two grooved rollers.

FIG. 4 shows the two grooved rollers 4, 5, which each have grooves 8 in the circumferential direction. The webs 53 of the grooved roller 5 are made of rubber, and the webs 43 of the grooved roller 4 are made of knurled metal, the knurling pattern of the roller 4 being shown in FIG. 4. Here, the two grooved rollers 4, 5 are arranged with respect to one another in such a way that the webs 53 of the roller 5 and 43 of the roller 4 make contact with a defined force, so that only one grooved roller has to be equipped with a motor 6, since the drive of the grooved roller 4 takes place indirectly via the grooved roller 5. Furthermore, the fact that the grooved rollers 4, 5 bear against one another in this way has the advantage that the carrier strip 1 is further transported with a force fit, so that it is possible to work against a pressure that builds up in the label-devoid strip store due to the stored carrier strip 1.

What is claimed is:

1. An apparatus for transporting a label strip, the label strip including at least one carrier strip, the apparatus comprising:
   an exchangeable frame;
   at least two rollers attached to the frame, said at least two rollers having grooves;
   first and second strip guiding devices downstream of the rollers, the strip guiding devices each comprising a channel; and
   first and second label-devoid strip stores, an end of each channel being actively connected to one of the label-devoid strip stores, which serves to store a certain stock of said carrier strip, the active channel being in direct contact with the label devoid strip store.

2. The apparatus according to claim 1, wherein a first roller of said rollers is configured to be driven by a motor, and a second roller of said rollers is configured to be driven indirectly via the first roller.

3. The apparatus according to claim 1, wherein a first roller of said rollers and a second roller of said rollers are each configured to be driven by a dedicated motor.

4. The apparatus according to claim 1, wherein the two rollers make contact at least over part of their circumference.

5. The apparatus according to claim 1, wherein at least one of said rollers is provided with a coating which increases the coefficient of friction.

6. The apparatus according to claim 1, wherein at least one of said rollers is provided with a rubber coating over part of its circumference.

7. The apparatus according to claim 1, wherein at least one of said rollers is provided with a fluted surface at least over part of its circumference.

8. The apparatus according to claim 1, wherein a first roller of said rollers is provided with a rubberized surface and a second roller of said rollers is provided with a fluted surface.

9. The apparatus according to claim 1, wherein one roller of said rollers has a scraper element which engages in the grooves at least over part of the circumference.

10. The apparatus according to claim 1, wherein both of said rollers have scraper elements which engage in the grooves at least over part of the circumference.

11. The apparatus according to claim 1, wherein each strip guiding device is assigned a label-devoid strip store.

12. The apparatus according to claim 1, wherein said at least one strip guiding device includes two of said strip guiding devices downstream of the rollers, said two strip guiding devices being attached to the exchangeable frame.

13. The apparatus according to claim 12, wherein a position of the exchangeable frame is variable, said exchangeable frame having at least as many positions as there are strip guiding devices.

14. The apparatus according to claim 12, wherein the exchangeable frame is designed so that, in each position, one of said strip guiding devices is arranged in such a way that an active connection exists between the rollers and the strip guiding device.

15. The apparatus according to claim 12, wherein the exchangeable frame has a handle.

16. The apparatus according to claim 12, further comprising at least one cutting element fitted on the exchangeable frame.

17. The apparatus according to claim 1, further comprising at least one cutting element fitted on an element connected to the frame.

18. The apparatus according to claim 1, wherein the distance between the two rollers is variable.

19. The apparatus according to claim 1, wherein one of said rollers is arranged such that it can pivot about a rotation axis.

20. The apparatus according to claim 19, wherein said pivotable roller has a locking mechanism which prevents any undesired pivoting.

21. The apparatus according to claim 1, wherein the label devoid strip store includes an open end, the open end being connected to said end of the channel of said strip guiding device.

22. An apparatus for transporting a label strip, the label strip including at least one carrier strip, the apparatus comprising:
   an exchangeable frame;
   at least two rollers attached to the frame, said at least two rollers having grooves;
   first and second strip guiding devices downstream of the rollers, the first and second strip guiding devices each comprising an exit channel through which the at least one carrier strip is guided; and
   first and second label-devoid strip stores, an end of each channel being actively connected to one of the label-devoid strip stores, which serves to store a certain stock of said carrier strip,
   wherein the at least one strip guiding device is configured as a holder for said label-devoid strip store.

23. The apparatus of claim 1, wherein the label devoid strip store comprises a bag.

24. The apparatus of claim 23, wherein the strip guiding device comprises a bag holder, wherein the strip guiding device guides the at least one carrier strip, and wherein the strip guiding device holds the bag.

25. The apparatus of claim 1, wherein the label devoid strip store comprises one of a basket or a box.

26. The apparatus of claim 1, wherein the strip guiding device is moveable.

* * * * *